United States Patent
Bernini

(10) Patent No.: US 8,285,435 B2
(45) Date of Patent: Oct. 9, 2012

(54) LAWN MOWER

(76) Inventor: Fabrizio Bernini, Bucine (IT)

( * ) Notice: Subject to any disclaimer, the term of this patent is extended or adjusted under 35 U.S.C. 154(b) by 145 days.

(21) Appl. No.: 12/821,563

(22) Filed: Jun. 23, 2010

(65) Prior Publication Data

US 2010/0326030 A1    Dec. 30, 2010

(30) Foreign Application Priority Data

Jun. 30, 2009    (IT) .................................. MI09A1157

(51) Int. Cl.
*G05D 1/00*    (2006.01)
(52) U.S. Cl. .......................................................... 701/23
(58) Field of Classification Search ................ 172/2–11; 56/10.2 A–10.2 E, 10.2 R; 701/23, 25, 50, 701/207; 700/245, 258; 318/580, 568.12, 318/587; 180/168, 169, 274, 275, 277, 279; 293/2, 4, 102
See application file for complete search history.

(56) References Cited

U.S. PATENT DOCUMENTS

| | | | |
|---|---|---|---|
| 6,443,509 B1 * | 9/2002 | Levin et al. ........................ | 293/4 |
| 7,103,457 B2 * | 9/2006 | Dean ................................ | 701/23 |
| 7,173,391 B2 * | 2/2007 | Jones et al. ............... | 318/568.12 |
| 7,613,552 B2 | 11/2009 | Bernini | |
| 2001/0022506 A1 | 9/2001 | Peless | |
| 2003/0144774 A1 | 7/2003 | Trissel et al. | |
| 2007/0142964 A1 * | 6/2007 | Abramson ..................... | 700/245 |
| 2008/0282658 A1 | 11/2008 | Bernini | |

FOREIGN PATENT DOCUMENTS

| | | |
|---|---|---|
| DE | 10120895 A1 | 11/2001 |
| EP | 1992211 A1 | 11/2008 |
| IT | FI2005A000250 | 5/2007 |
| WO | 2007066195 | 6/2007 |

\* cited by examiner

*Primary Examiner* — Robert Pezzuto
(74) *Attorney, Agent, or Firm* — Pearne & Gordon LLP

(57) ABSTRACT

A lawn mower comprising: a frame (10); wheels and motors (20a;20b) for moving the frame (10) relative to a work surface (L); one or more blades (30) for cutting the grass on the work surface (L); a plurality of sensors (S1, S2) for generating detection signals (SR) representative of a distance of a mass (M) relative to the frame (10); a control unit (40) for determining, as a function of the detection signals (SR), whether the mass (M) is at a distance from the frame (10) within a predetermined value range, and to adjust the operating conditions of the lawn mower (1) as a function of the detection signals (SR); a selection circuit (50) interposed between the control unit (40) and sensors (S1, S2) for selectively enabling a connection between each of the sensors (S1, S2) and an input of the control unit (40).

16 Claims, 2 Drawing Sheets

LAWN MOWER

FIELD OF THE INVENTION

The present invention relates to a lawn mower.

DESCRIPTION OF RELATED ART

It is known that lawn mowers that are presently available on the market comprise a frame, made up of an upper bodywork and a lower bodywork for example, and a plurality of powered wheels, adapted to move the frame on the surface on which the lawn mower is designed to operate; lawn mowers further comprise one or more blades mounted on the frame for cutting the grass present on the work surface.

In the most sophisticated versions lawn mowers also comprise a plurality of sensors for detecting the presence of grass to some distance from the frame, so that the blades can be selectively activated/deactivated depending on the presence of grass.

The sensors typically used in this types of applications can be of the mechanical, optical, chromatic type, RF sensors, inductive-effect and capacitive-effect sensors, ultrasonic sensors, and so on.

A typical problem in lawn mowers of known type concerns the substantially simultaneous management of the signals arriving in parallel from the sensors at the processing unit designed to supervise operation of said lawn mowers. This problem in particular is connected with the fact that, above all in applications in which provision is made for use of electronic sensors equipped with active elements, there is a high risk of interference between the sensors themselves and the signals generated thereby, which interference can alter the reading carried out and therefore cause a wrong operation of the apparatus.

Clearly this gives rise to an unsatisfactory result in terms of accuracy, homogeneity and completeness of the grass cutting operation as executed.

Accordingly, the present invention aims at making available a lawn mower capable of performing its task with accuracy, homogeneity and completeness.

Another aim of the invention is to provide a lawn mower capable of significantly reducing the mutual interferences between the different sensors used and the signals generated by the same.

A further aim of the invention is to make available a lawn mower capable of detecting the presence of external masses in a reliable manner, above all with reference to the grass of a given height that has to be cut.

It is an auxiliary aim of the invention to provide a lawn mower capable of suitably performing its task through management of a plurality of electronic sensors provided with active and/or oscillatory elements.

SUMMARY OF THE INVENTION

The foregoing and still further aims are substantially achieved by a lawn mower in accordance with the description given in the appended claims.

Further features and advantages will become more apparent from the detailed description of a preferred and not exclusive embodiment of the invention.

BRIEF DESCRIPTION OF THE DRAWINGS

This description is set out hereinafter with reference to the accompanying drawings, given by way of non-limiting example, in which.

DETAILED DESCRIPTION OF PREFERRED EMBODIMENTS OF THE INVENTION

Figure 1:
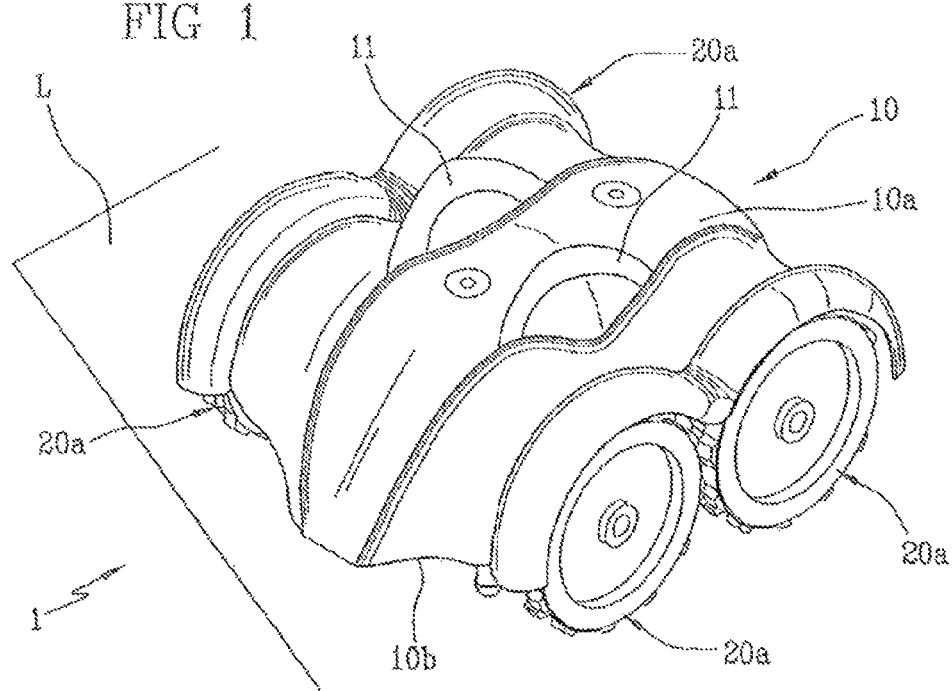
FIG. 1 diagrammatically shows a lawn mower in accordance with the present invention.

With reference to the accompanying drawings, a lawn mower according to the invention has been generally identified with reference numeral 1.

The lawn mower 1 first of all comprises a frame 10; frame 10 may include an upper bodywork 10a and a lower bodywork 10b for example, which are preferably associated with each other in a removable manner. The upper bodywork 10a and lower bodywork 10b can be made of a plastic material, for example.

In the preferred embodiment, frame 10 further comprises one or more handles 11, to enable a user to grasp the lawn mower 1; preferably handles 11 are made of a metal material.

In the embodiment shown in FIG. 1, frame 1 is provided with two handles 11; obviously the lawn mower 1 can also have a different number of handles, depending on the application's specific requirements.

The lawn mower 1 further comprises actuating means 20 to move frame 10 relative to a work surface L; said work surface can be a lawn, garden, flowerbed or generally any surface on which the lawn mower 1 is designed to operate.

The actuating means 20 preferably comprises a plurality of wheels 20a mounted on frame 10, and one or more motors 20b provided for driving said wheels 20a in rotation.

By way of example, the lawn mower 1 shown in the accompanying drawings is provided with four suitably powered wheels 20a.

Figure 2:
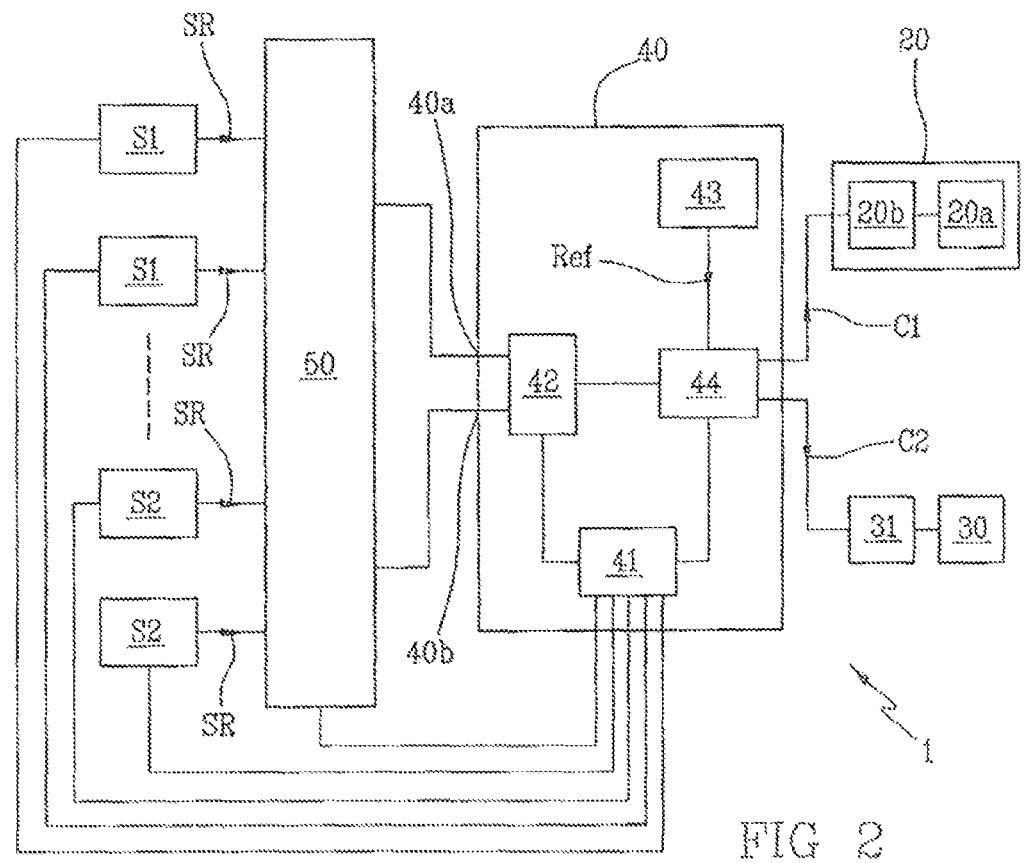
FIG. 2 shows a block diagram of a control structure of the lawn mower seen in FIG. 1.

The lawn mower 1 further comprises one or more blades 30 (diagrammatically shown in FIG. 2) mounted on frame 10 for cutting the grass present on the work surface L. Advantageously, blades 30 are actuated by suitable motors 31 housed inside frame 10.

By way of example, motors 20b, 31 can be electric motors, powered by a battery; said battery can be of the rechargeable type. A battery recharging which takes place at a fixed station, is preferably obtained by electric coupling, in particular of the inductive type.

The lawn mower 1 further comprises a plurality of sensors S1, S2 suitable to generate detection signals SR representative of a distance of a mass M from frame 10. In particular, a particular region or a particular point of frame 10 can be defined, relative to which the distance between frame 10 and the external mass M is evaluated.

Practically, sensors S1, S2 can be proximity and/or contact sensors.

As better clarified in the following, among the tasks of said sensors S1, S2 there is that of detecting the presence of grass, to some distance from frame 10 (i.e., practically, the presence of grass having a given height relative to the ground constituting the work surface L), so that a fully automatic operation of the lawn mower is allowed.

Another task of sensors S1, S2 can be that of detecting possible contacts between frame 10 (in particular said handles 11) and an operator's body, so that safety stopping procedures for preventing accidents to the operator are activated, which accidents are mainly due to the movement of the lawn mower 1 and the respective blades 30 when the operator is in close proximity thereto.

The lawn mower 1 is provided with a control unit 40 adapted to regulate the lawn mower's operating conditions depending on said detection signals SR.

These operating conditions may comprise:
- activation/deactivation of the actuating means 20 depending on the presence of grass on the work surface L;
- activation/deactivation of the blades 30 depending on the presence of grass on the work surface L;
- activation/deactivation of the actuating means 20 depending on a contact between frame 10 (handles 22) and a human body;
- activation/deactivation of the blades 30 depending on a contact between frame 10 (handles 11) and the human body.

In the preferred embodiment, each sensor S1, S2 comprises an oscillator O adapted to generate a signal Sf at an oscillation frequency f; oscillator O in particular comprises an active element AE consisting of a device D of the MOS type.

Said active element AE has an input AE associated with a detecting element R; oscillator O varies its oscillation frequency f as a function of a distance between the detecting element R and the external mass M whose presence is determined. Practically, the detecting element R can consist of a metal plate, a wire, or any other element adapted to act as an antenna.

When the air volume surrounding the detecting element R is perturbed, due to the presence of grass for example, the oscillation frequency f of oscillator O is correspondingly varied; therefore, by suitably positioning the detecting element R and suitably calibrating the circuit, it is possible to make the system determine the presence of a mass M external to the lawn mower at some distance from frame 10.

In particular, it is possible to determine whether the distance between the external mass M and frame 10 is included within a predetermined range; depending on whether the distance value is within this range, the control unit 40 establishes the appropriate work conditions of the lawn mower.

Preferably, this predetermined range consists of values smaller than a predetermined threshold; in some applications, a substantially null distance can be considered as included within this range.

Therefore, as above mentioned, sensors S1, S2 can be used as proximity and/or contact sensors.

By way of example, the detecting elements R can be positioned on a lower portion of frame 10, located in said lower bodywork 10*b* for example, so that they at least partly face the work surface L. This positioning can be advantageous as regards sensors used for determining the presence of grass to be cut; as to sensors used for determining a contact condition with an external body, the detecting element R can comprise one of said handles 11.

Conveniently, the detection signals SR generated by sensors S1, S2 are representative of the oscillation frequency f of the respective oscillators O; the control unit 40 in particular is suitable to adjust the operating conditions of the lawn mower 1 as a function of such an oscillation frequency f.

Figure 3:
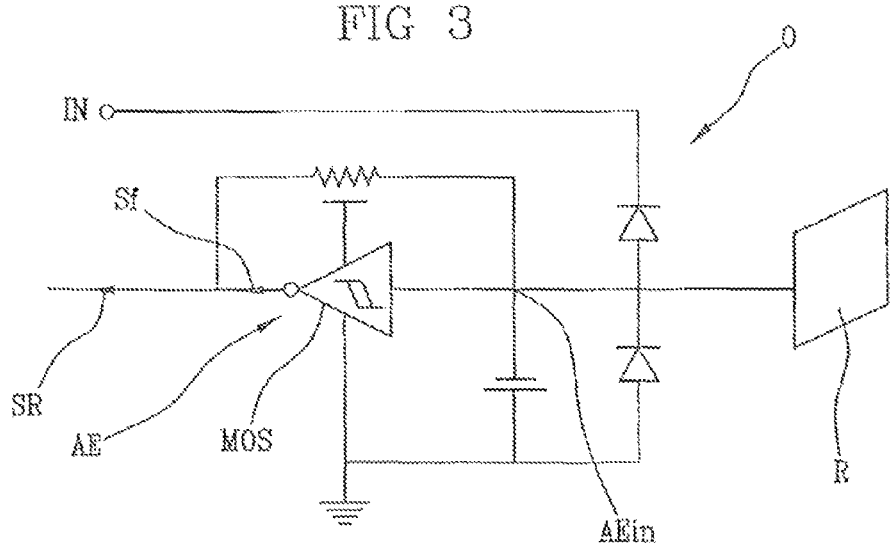
FIG. 3 shows an embodiment of the circuit of a functional block of the diagram in FIG. 2.

FIG. 3 diagrammatically shows a possible structure of a sensor S1, S2.

Oscillator O is configured like a Schmitt trigger in which the active element consists of a transistor of the MOS type.

The detecting element R, diagrammatically shown as a plate, is directly connected to the gate terminal of the MOS transistor, i.e. the input $AE_{in}$ of the active element AE.

If no objects or masses are present in the vicinity of the detecting element R, sensor S1, S2 generates a periodical signal of a predetermined frequency f, i.e. said detecting signal SR.

On the contrary, if there is a perturbing body (i.e. the external mass M) in the vicinity of, or in contact with the detecting element R, the frequency of said periodical signal appears to be significantly varied. This variation can be proportional to the distance between the perturbing body and the detecting element R; in particular, in case of contact between the perturbing body and detecting element R, the oscillation frequency f will suffer for a very important reduction.

A possible embodiment of a sensor S1, S2 is described in the Italian Patent Application No. FI2005A000250.

The control unit 40 receives the detection signal SR and, by a suitable counting module 42, determines the number of pulses per time unit constituting the detection signal SR itself. Preferably, the value indicating this pulse number is stored in a storage register 43 of the control unit 40.

The control unit 40 further comprises a comparison module 44 to compare said value with a reference value Ref; said reference value can consist of a previously stored threshold value for example, which is representative of the distance limit to which the grass can be with respect to the detecting element R, so that it will be considered as "grass to be cut".

As to the sensors provided for detecting possible contacts between the operator's body and frame 10, the reference value can be different and exactly representative of the contact between one portion of the user's body and the detecting element R.

If the control unit 40 determines that the grass being under the frame is too high (i.e. if the frequency of one or more detection signals SR is lower than the reference value Ref), said control unit generates one or more suitable command signals C1 so as to activate movement of blades 30 and, if necessary, movement of wheels 20*a*.

The command signals C1 will be then sent to motor (or motors) 31 acting on blades 30 and possibly also to motor (or motors) 20*b* acting on wheels 20*a*.

Vice versa, if the control unit 40 finds that there is no grass to be cut under the frame (i.e. the frequency f of the detection signals is higher than the reference value Ref), said control unit generates one or more command signals C2 for moving the grass mower 10 in search of regions of the work surface L on which an intervention is required. The command signals C2 will be then sent to motor (or motors) 20*b* acting on wheels 20*a*.

Advantageously, the lawn mower 1 further comprises a selection circuit 50 interposed in a circuit between the control unit 40 and sensors S1, S2, and adapted to selectively enable a connection between each of said sensors S1, S2 and an input 40*a* of said control unit 40.

Preferably, the selection circuit 50 is interlocked with the control unit 40, so that said control unit can sequentially query the different sensors S1, S2 and suitably operate motors 20*b*, 31. In greater detail, the control unit 40 is provided with an operating module 41 adapted to sequentially select sensors S1, S2; the operating module 41 is suitable for operation on the selection circuit 50 to enable a connection between at least one selected sensor S1, S2 and an input 40*a* of the control unit 40.

In addition, the operating module 41 has a configuration adapted to operate on the selection circuit 50, so as to inhibit a connection between the unselected sensors and the input 40*a* of the control unit 40.

In addition to the above, the operating module 41 is further designed to deactivate the unselected sensors; preferably, this deactivation operation of the unselected sensors is performed through deactivation of the oscillator O of these unselected sensors.

Preferably, the operating module 41 inhibits connection between the unselected sensors S1, S2 and the input 40a, 40b of the control unit 40 and deactivates the unselected sensors S1, S2 by sending the same signal to the selection circuit 50 and the unselected sensors S1, S2.

In other words, the same output of the selection module 41 (i.e. an output of the control unit 40) is connected both to one of sensors S1, S2 and to the selection circuit 50, and in particular to an input 52b of the input module 52 associated with such a sensor (as better clarified in the following).

Therefore, when the selection module 41 sends a "low" logic signal or a deactivation signal through an output thereof, this signal carries out deactivation of the sensor S1, S2 receiving it and simultaneously carries out deactivation of the input module 52 associated with such a sensor.

In this way the possibility or interferences and overlapping between the signals generated by the different sensors and by the oscillators incorporated thereinto is eliminated, and consequently the reception quality of the control unit 40 and the reliability of the management carried out by said unit 40 are correspondingly optimised.

Connection between the selection module 41 and each of sensors S1, S2 can take place through the input IN with which each sensor is preferably provided (FIG. 3).

Figure 4:
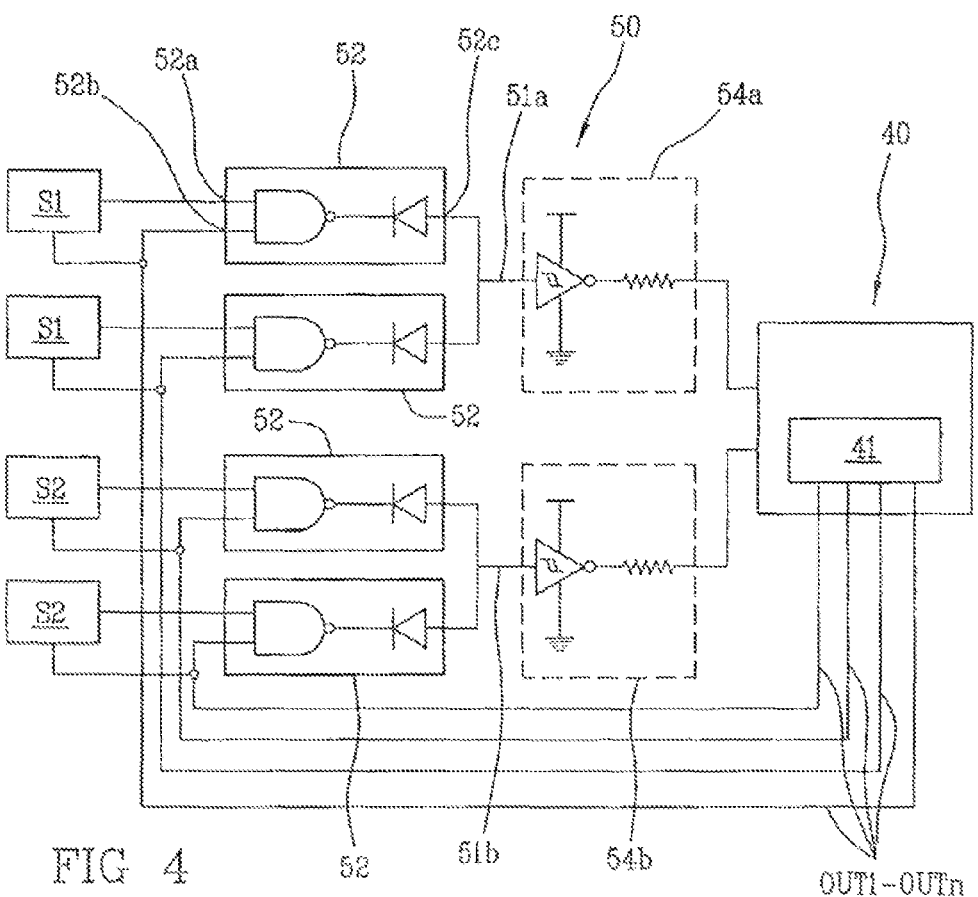
FIG. 4 shows an embodiment of the circuit of another functional block of the diagram in FIG. 2.

As diagrammatically shown in FIG. 4, the selection circuit 50 comprises: at least one output 51a, 51b connected to an input 40a, 40b of the control unit 40, to supply said control unit 40 with data representative of said detection signals SR; a plurality of input modules 52, each drivable between a first operating condition at which it allows a connection between an input 52a thereof and an output 51a, 51b of the selection circuit 50, and a second operating condition at which it does not allow this connection.

Each input module 52 has a first input 52a, connected to a respective one of said sensors S1, S2, and a second input 52b, connected to a respective output OUT1-OUTn of said control unit to enable said control unit to drive the input modules 52 between the first and second operating conditions.

The outputs OUT1-OUTn are managed by said selection module 41 for the purpose of suitably selecting sensors S1, S2.

As mentioned above, the control unit 40 is preferably configured for adjusting the operating conditions of the lawn mower 1 depending on the grass present on the work surface L and/or depending on a contact between a human body and frame 10.

Therefore, in the preferred embodiment, sensors S1, S2 of the lawn mower 1 comprise a first series of sensors S1, adapted to detect the presence of grass on the work surface L, and a second series of sensors S2 adapted to detect a contact between frame 10 (and in particular one handle 11) and a human body.

The oscillators O of sensors S1 of the first series preferably operate at a frequency included between 800 KHz and 1.2 MHz; by way of example, this frequency can be of about 1 MHz.

The oscillators O of sensors S2 of the second series preferably operate at a lower frequency than the oscillators O of sensors S1 of the first series.

The operating frequency f of oscillators O of sensors S2 belonging to the second series can be included between 400 KHz and 600 KHz; by way of example, this frequency can be of about 500 KHz.

Advantageously, the first series of sensors S1 and the second series of sensors S2 are managed separately from the control unit 40. In particular, the selection circuit 50 can have a first output 51a associated with sensors S1 belonging to the first series, and a second output 51b associated with sensors S2 belonging to the second series.

The output 52c of the input modules 52 connected to sensors S1 of the first series is connected to the first output 51a of the selection circuit 50; the output 52c of the input modules 52 connected to sensors S2 of the second series is connected to the second output 51b of the selection circuit 50.

By way of example, each input module 52 can comprise a NAND gate and a diode, as diagrammatically shown in FIG. 4.

As mentioned above, different reference values to be supplied to the comparison module 44 as an input can be required by sensors S1 suitable to enable detection of the presence of grass to be cut, and sensors S2 adapted to find out a contact with the operator; to this aim, the selection module 41 is suitably associated with the comparison module 44 and/or the storage register 43 to make the comparison module 44 take into consideration the correct reference, as a function of the sensor detection of which is being examined. In fact it is the selection module 41 that in succession selects the sensors S1, S2 providing the control unit 40 with the detection signals SR to be processed.

Preferably, the outputs 51a, 51b of the selection circuit 50 are connected to respective inputs of the control unit 40 through respective squaring modules 54a, 54b designed to suitably form the pulses that will have to be counted and processed by the control unit 40.

From the point of view of operation, the following is to be pointed out.

The lawn mower 1 is positioned on the work surface L. The selection module 41 sequentially queries sensors S1, S2. Preferably, sensors S1 of the first series are managed separately from sensors S2 of the second series; therefore, at each instant, a sensor S1 of the first series can be queried simultaneously with a sensor S2 of the second series.

When a sensor S1, S2 is selected, the selection module 41 of the control unit 40 sends a "high" logic signal or activation signal to such a sensor; an analog signal (preferably, physically the same signal) is also sent to the input module 52 associated with such a sensor. In this manner, the selected sensor is electrically active and connection between said sensor and an input 40a, 40b of the control unit 40 is enabled.

Vice versa, the unselected sensors are deactivated through a "low" logic signal or a deactivation signal. This "low" signal is sent to all unselected sensors and the respective input modules. As above said, preferably through a single signal, an unselected sensor and the corresponding input module 52 are deactivated.

The selected sensor, through the respective input module 52 and possibly the squaring module 54a, 54b provides the control unit 40 with its own detection signal SR.

Through the counting module 42, the control unit 40 establishes how many pulses are present in the detection signal SR within a given time interval. This pulse number, through a comparison module 44, is compared with a suitable reference value Ref, preferably stored in the storage register 43.

As above said, in the storage register 43 two different references can be present: one for sensors S1 of the first series and one for sensors S2 of the second series. The selection module 41 is suitably connected to the storage register 43 and/or the comparison module for selecting the correct reference Ref depending on whether the selected sensor belongs to the first series or to the second series.

In an embodiment, the comparison module can be divided into two distinct sections, one dedicated to the first series of sensors S1 and one dedicated to the second series of sensors S2. In this manner, selection of the reference to be taken into account will not be necessary, since each section of the comparison module only receives the suitable reference as an input.

If, following the carried out comparison, module 44 determines that there is grass to be cut under the lawn mower 1, then blades 30 are set in motion by sending command signals C2 to motor (or motors) 31 acting on said blades.

Depending on the entered operation algorithm, under this condition a command signal C1 can be also sent to the motor (or motors) 20b driving the wheels 20a, to cause the lawn mower to move forward during the cutting operation.

Generally, if only one of sensors S1 of the first series detects the presence of grass, this detection is sufficient to cause activation of blades 30; however, use of more complex algorithms is provided which combine the information supplied by the different sensors S1 of the first series with each other before deciding on activation of blades 30.

Vice versa, if none of sensors S1 of the first series ascertains the presence of grass or if, following the information supplied by the different sensors S1 of the first series, the control unit 40 determines that there is no grass to be cut under the lawn mower 1, one o more command signals C1 are sent to motor (or motors) 20b driving the wheels 20a in motion, to cause the lawn mower 1 to move forward in search of grass to be cut on the work surface L.

The comparison module 42 also carries out a comparison between the detection signals SR (in particular, the number of pulses per time unit present therein) supplied by sensors S2 of the second series and the respective reference.

If it is found out that a body is in contact with frame 10, and in particular with one handle 11, then through one or more commands, blades 30 (if they were active) and the actuating means 20 are deactivated.

It is to be noted that the control unit 40 has been shown divided into different modules for describing the operating qualities of same in a clear manner; it should be however understood that the control unit 40 can be made as a single electronic device, a microprocessor suitably programmed for performing the described functions for example.

At all events, the control unit 40 can also be obtained through an analog circuit capable of controlling the lawn mower 1 in the manner discussed above.

The invention achieves important advantages.

First of all, the lawn mower in accordance with the invention is able to perform its task with accuracy, homogeneity and completeness.

In addition, due to the structure of the detection and control circuits, possible interferences between the different sensors used and the signals generated by them are significantly limited.

A further auxiliary advantage is found in that, in applications in which a plurality of electronic sensors provided with active and/or oscillatory elements is used, the lawn mower in accordance with the invention is in any case able to suitably perform its task, managing said sensors and the detection signals generated therein in an appropriate manner.

The invention claimed is:

1. A lawn mower comprising:
    a frame (10);
    actuating means (20) for moving said frame (10) relative to a work surface (L);
    one or more blades (30) mounted on said frame (10) for cutting the grass present on said work surface (L);
    a plurality of sensors (S1, S2) for generating detection signals (SR) representative of a distance of a mass (M) relative to said frame (10);
wherein said plurality of sensors comprises a first series of sensors (S1) adapted to detect the presence of grass on said work surface (L);
    a control unit (40) adapted to determine, as a function of said detection signals (SR), whether said mass is at a distance from said frame (10) which is included within a predetermined value range, and to adjust operating conditions of said lawn mower (1) as a function of said detection signals (SR);
    a selection circuit (50) interposed in a circuit between said control unit (40) and sensors (S1, S2) and suitable to selectively enable a connection between each of said sensors (S1, S2) and an input of said control unit (40)
wherein, said selection circuit (50) is interlocked with said control unit (40) in such a way to regulate at least the operating conditions of:
    activation/deactivation of the actuating means (20) depending on the presence of grass on the work surface (L);
    activation/deactivation of the blades (30) depending on the presence of grass on the work surface (L).

2. A lawn mower as claimed in claim 1, wherein each of said sensors (S1, S2) comprises an oscillator (O) for generating a signal (Sf) at an oscillation frequency (f), said oscillator (O) including an active element (AE) consisting of a device (D) of a Metal-Oxide-Semiconductor (MOS) type and having an input $AE_{in}$ associated with a detecting element (R),
    said oscillator (O) varying said oscillation frequency (f) as a function of a distance between said detecting element (R) and said external mass (M).

3. A lawn mower as claimed in claim 1, wherein said plurality of sensors (S1, S2) comprises a second series of sensors (S2) adapted to detect a contact between said frame (10) and a human body,
    the second series of sensors (S2) operating to a lower frequency than the first series of sensors (S1).

4. A lawn mower as claimed in claim 1, wherein said control unit (40) is provided with an operating module (41), said operating module (41) being adapted to sequentially select said plurality of sensors (S1, S2) at least one at a time, said operating module (41) being adapted to operate on said selection circuit (50) to allow a connection between one selected sensor of said plurality of sensors (S1, S2) and an input (40a, 40b) of the control unit (40).

5. A lawn mower as claimed in claim 4, wherein said operating module (41) is adapted to operate on said selection circuit (50) for inhibiting a connection between unselected sensors of said plurality of sensors and said input (40a, 40b) of the control unit (40).

6. A lawn mower as claimed in claim 5, wherein said operating module (41) is adapted to deactivate said unselected sensors of said plurality of sensors.

7. A lawn mower as claimed in claim 6, wherein said operating module (41) is adapted to deactivate the oscillator (O) of said unselected sensors of said plurality of sensors for deactivating said unselected sensors.

8. A lawn mower as claimed in claim 6, wherein said operating module (41) is adapted to inhibit the connection between the unselected sensors of said plurality of sensors (S1, S2) and the input (40a, 40b) of the control unit (40), and to deactivate said unselected sensors of said plurality of sensors (S1, S2) by sending the same deactivation signal to said selection circuit (50) and said unselected sensors of said plurality of sensors (S1, S2).

9. A lawn mower as claimed in claim 1, wherein said selection circuit (50) comprises:
- at least one output (51a, 51b) connected to said input (40a, 40b) of the control unit (40), for supplying the latter with data representative of said detection signals (S);
- a plurality of input modules (52), each drivable between a first operating condition at which it allows a connection between an input thereof (52a) and said at least one output (51a, 51b) of said selection circuit (50), and a second operating condition at which it does not allow said connection.

10. A lawn mower as claimed in claim 9, wherein each of said input modules (52) has the first input (52a) connected to a respective one of said plurality of sensors (S1, S2) and a second input (52b) connected to a respective output (OUT1-OUTn) of said control unit (40) to enable said unit to drive said input modules (52) between said first and second operating conditions.

11. A lawn mower as claimed in claim 10, wherein each of said input modules (52) has the first input (52a) connected to a respective one of said sensors of said plurality of sensors (S1, S2) and a second input (52b) connected to the respective output (OUT1-OUTn) of said control unit (40) to enable said unit to drive said input modules (52) between said first and second operating conditions,
- wherein said selection circuit (50) has the first output (51a) associated with sensors belonging to said first series of sensors (S1),
- the output (52c) of the input modules (52) connected to sensors belonging to said first series of sensors (S1) being connected to said first output (51a).

12. A lawn mower as claimed in claim 10, wherein each of said input modules (52) has a first input (52a) connected to a respective one of said sensors of said plurality of sensors (S1, S2) and a second input (52b) connected to a respective output (OUT1-OUTn) of said control unit (40) to enable said unit to drive said input modules (52) between said first and second operating conditions,
- wherein said selection circuit has a second output (51b) associated with the sensors belonging to said second series of sensors (S2),
- the output (52c) of the input modules (52) connected to the sensors (S2) of the second series being connected to the second output (51b).

13. A lawn mower as claimed in claim 1, wherein said detection signals (SR) are representative of the oscillation frequency (f) of the respective sensors of said plurality of sensors (S1, S2), said control unit (40) being adapted to adjust the operating conditions of said lawn mower (1) as a function of said oscillation frequency (f).

14. A lawn mower as claimed in claim 13, wherein said control unit (40) comprises a comparison module (42) configured for comparing said oscillation frequencies with one or more of respective reference values (Ref),
- said control unit (40) being adapted to adjust said operating conditions of the lawn mower (1) as a function of said comparison.

15. A lawn mower as claimed in claim 1, wherein said predetermined value range consists of values lower than a predetermined threshold.

16. A lawn mower as claimed in claim 1, wherein said operating conditions comprise at least one of the following:
- activation/deactivation of said actuating means, depending on the presence of grass on said work surface;
- activation/deactivation of said blades, depending on the presence of grass on said work surface;
- activation/deactivation of said actuating means, depending on a contact between said frame and a human body;
- activation/deactivation of said one or more blades, depending on a contact between said frame and a human body.

* * * * *